D. E. HUMBKE.
THRESHER SEPARATOR.
APPLICATION FILED APR. 13, 1920.
1,366,691.
Patented Jan. 25, 1921.
2 SHEETS—SHEET 2.
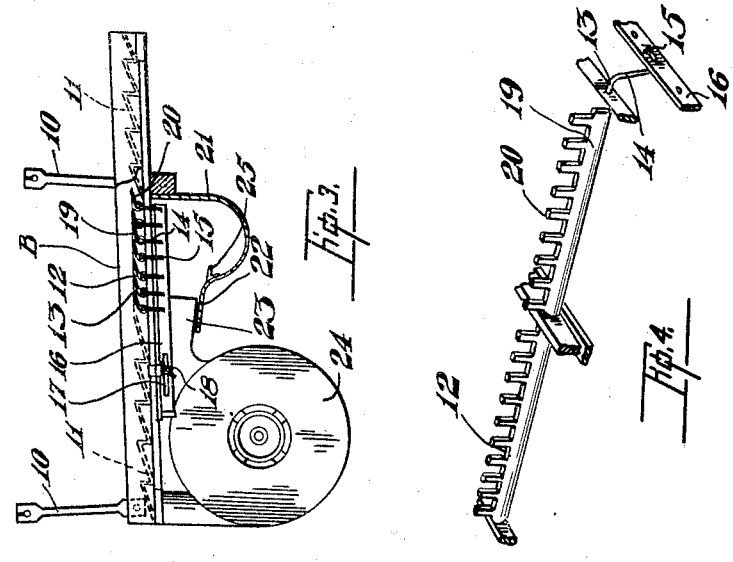
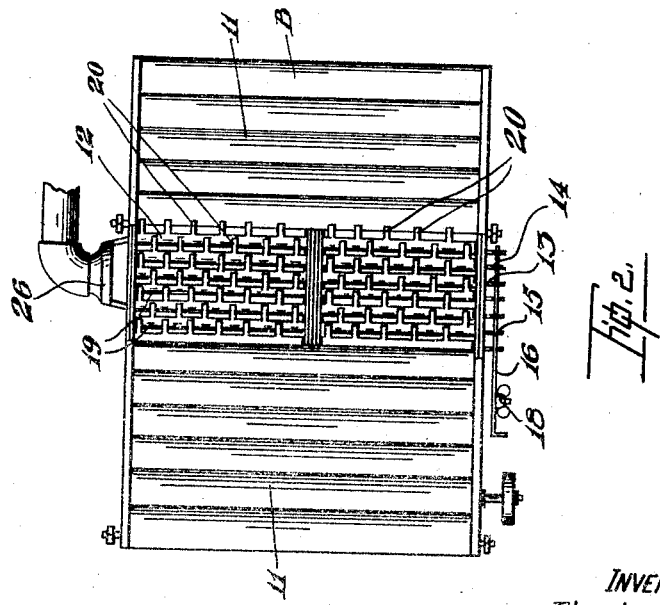
INVENTOR
DIETRICH. E. HUMBKE.
BY
ATT'YS

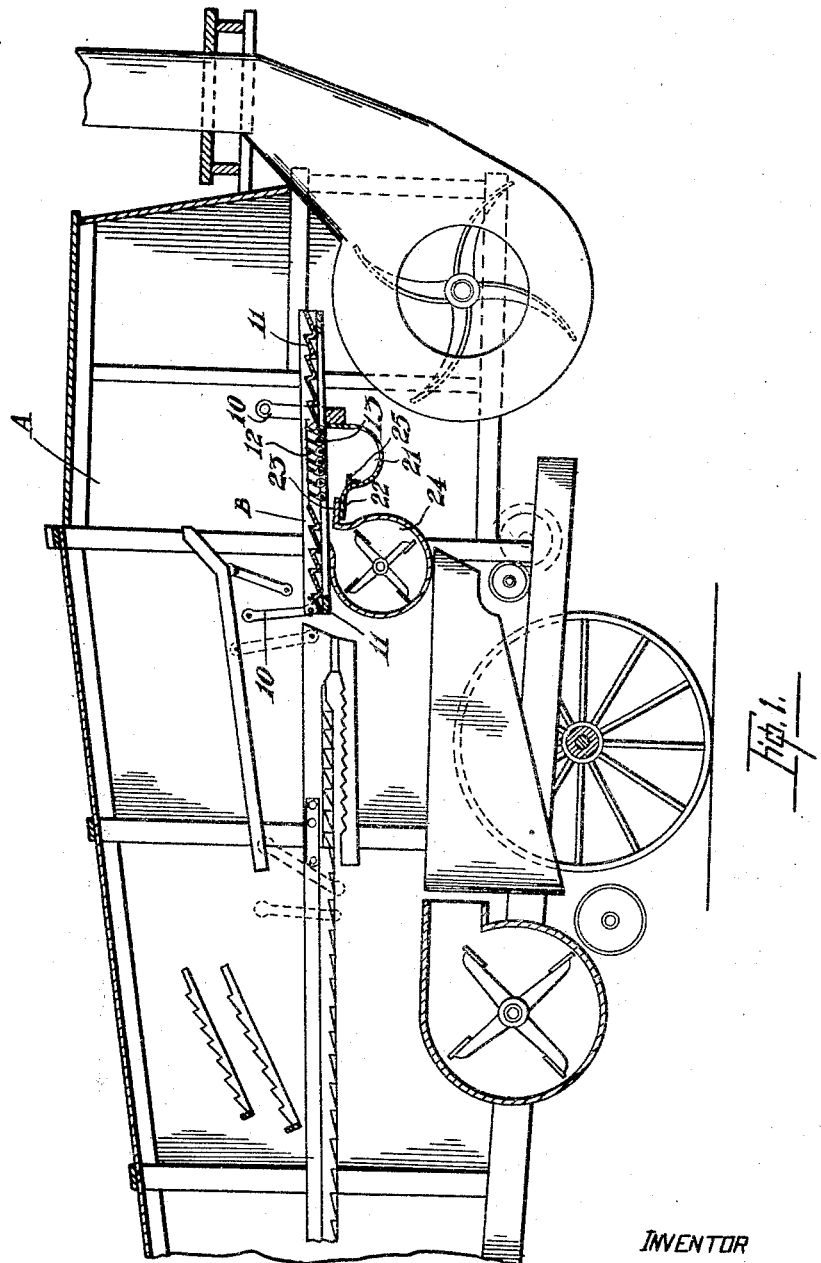

UNITED STATES PATENT OFFICE.

DETRICH ERNEST HUMBKE, OF WETASKIWIN, ALBERTA, CANADA.

THRESHER-SEPARATOR.

1,366,691. Specification of Letters Patent. Patented Jan. 25, 1921.

Application filed April 13, 1920. Serial No. 373,551.

*To all whom it may concern:*

Be it known that I, DETRICH ERNEST HUMBKE, a subject of the King of Great Britain, and resident of Wetaskiwin, in the Province of Alberta, Dominion of Canada, have invented certain new and useful Improvements in Thresher-Separators, of which the following is a specification.

This invention relates to improvements in threshing machines, and the objects of the invention are to increase the efficiency of the machine by recovering certain portions of grain which are usually carried off in the chaff, to permit of the device being utilized on standard threshers at present in use, and to render the several parts readily accessible for inspection and repair.

With the above and other objects in view, the invention consists essentially of the improved construction particularly described and set forth in the following specification and accompanying drawings forming part of the same.

In the drawings:

Figure 1 is a fragmentary longitudinal section of a threshing machine embodying my invention.

Fig. 2 is a plan view of a shaker showing the improved adjustable sieve mounted thereon.

Fig. 3 is a side elevation of the shaker and sieves shown in Fig. 2, part of the shaker being broken away, and the grain chutes being in section.

Fig. 4 is a perspective view of a portion of the adjustable sieve.

Like characters of reference refer to like parts in the several figures.

Referring to the drawings: A represents a thresher of any usual construction in which the shaker B is supported by links 10, and the shaker may be reciprocated by any suitable means.

The shaker B is located between the rear end of the present chaff sieves and the blower, the said chaff sieves and blower being common to ordinary threshers, so that it is not deemed necessary to describe the same, because their functions are well known and clearly understood in the art.

The shaker B is provided with a plurality of ridges 11 located at the front and rear of said shaker, and between these ridges an adjustable sieve 12 is located. This sieve 12 consists of a plurality of transversely extending rods 13 having crank ends 14 terminating in hooks 15, which engage with the longitudinally extending bar 16 provided with a slot 17 adapted to engage with an adjusting screw 18, which is carried by one of the lateral walls of the shaker B.

On the transversely extending wires 13 sieve plates 19 are mounted and provided with a plurality of fingers 20, and as the bar 16 is moved longitudinally the crank ends 14 are rotated through a small angle, so that the inclination of the fingers 20 of the seive plates may be adjusted to suit the type of stock being treated. It will thus be seen that all the sieve plates 19 will be adjusted simultaneously.

Below the shaker B, a transversely extending trough 21 is provided having one of its lateral walls offset as shown at 22 to underlie the discharge conduit 23 of the fan 24, which is located below the shaker and is driven from any suitable source of power and in any convenient manner.

The air draft from the fan 24 is delivered to the trough 21 in such a manner that it will pass upwardly through the sieve plates 19, and so carry off the chaff which will be delivered to the blower at the rear of the thresher A, while the good grain will fall into the trough 21.

There may be a tendency of a swirling action of the air in the trough 21 which would tend to blow the grain out of the trough, and to overcome this objection, I provide an inwardly extending lip 25 which will arrest the grain and prevent its being blown out laterally from the trough.

The grain delivered to the trough 21 will gravitate to one end thereof, and be discharged through a conduit 26 to the side of the machine, where it may be collected. Heretofore the chaff and grain carried thereby, which will be delivered to the shaker B, was carried off in the blower and consequently resulted in the loss of this grain. By the present invention the chaff before leaving the blower must pass over the shaker B and be fed thereacross and subjected to the air blast of the fan 24, and also to the vibratory action of the shaker B, the result being that the grain is liberated from the chaff which is delivered to the blower, whereas the good grain passes through the adjustable sieves and is collected in the trough 21.

The grain recovered in this way may be retreated by passing it through the thresher again, or it may be bagged.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. The combination with a thresher separator, of a shaker designed to be located between the rear of a chaff sieve, and a blower on the thresher, rigid members in the front and rear end of the shaker, an adjustable sieve between the said rigid members, a trough below the sieve, an inwardly extending lip on the trough, a fan designed to pass air through the sieve, and means for adjusting the sieve.

2. The combination claimed in claim 1, in which the trough is provided with an offset lateral wall, and the fan is formed with a discharge conduit overhanging the offset lateral wall of the trough.

In witness whereof I have hereunto set my hand in the presence of two witnesses.

DETRICH ERNEST HUMBKE.

Witnesses:
 LOUISE DRAPER,
 R. W. MANLEY.